United States Patent
Measom et al.

(10) Patent No.: US 10,858,090 B2
(45) Date of Patent: Dec. 8, 2020

(54) SYSTEMS AND METHODS OF CONSTRUCTING COMPOSITE ASSEMBLIES

(71) Applicant: Bell Textron Inc., Fort Worth, TX (US)

(72) Inventors: Ronald J. Measom, Hurst, TX (US); Mitchell Elvin Rains, Weatherford, TX (US)

(73) Assignee: BELL TEXTRON INC., Fort Worth, TX (US)

( * ) Notice: Subject to any disclaimer, the term of this patent is extended or adjusted under 35 U.S.C. 154(b) by 0 days.

(21) Appl. No.: 16/882,878

(22) Filed: May 26, 2020

(65) Prior Publication Data

US 2020/0298958 A1  Sep. 24, 2020

Related U.S. Application Data

(62) Division of application No. 14/015,576, filed on Aug. 30, 2013, now Pat. No. 10,723,438.

(51) Int. Cl.
*B64C 11/26* (2006.01)
*B29C 70/34* (2006.01)
(Continued)

(52) U.S. Cl.
CPC ............ *B64C 11/26* (2013.01); *B29C 70/342* (2013.01); *B29C 70/446* (2013.01); *B29C 70/86* (2013.01);
(Continued)

(58) Field of Classification Search
CPC ... B29C 70/345; B29C 70/342; B29C 70/446; B29C 70/86; B29C 2791/001; B64C 27/473; B64C 11/26; B64C 3/185; B64C 3/20; B64C 2027/4736; B29K 2105/20; B29L 2031/082
See application file for complete search history.

(56) References Cited

U.S. PATENT DOCUMENTS 3,217,807 A * 11/1965 Underhill, Jr. ........ B64C 27/473
416/226
3,333,642 A * 8/1967 Kee ...................... B64C 27/473
416/226
(Continued)

FOREIGN PATENT DOCUMENTS

CA   2861312 A1   2/2015
EP   2842726 A1   3/2015
(Continued)

OTHER PUBLICATIONS

European Patent Office, Partial Search Report for EP Appl. No. 13186943.0 dated Feb. 28, 2014, 7 pp.
(Continued)

*Primary Examiner* — Matthew T Largi
(74) *Attorney, Agent, or Firm* — Daniel J. Chalker; Edwin S. Flores; Chalker Flores, LLP

(57) ABSTRACT

A composite assembly has an outer spar component having an outer spar component inner profile, an inner spar component having an inner spar component outer profile substantially complementary to the outer spar component inner profile, and an adhesive disposed between the outer spar component and the inner spar component.

18 Claims, 11 Drawing Sheets

(51) Int. Cl.
  B29C 70/44   (2006.01)
  B64C 3/20    (2006.01)
  B29C 70/86   (2006.01)
  B64C 3/18    (2006.01)
  B64C 27/473  (2006.01)
  B29L 31/08   (2006.01)

(52) U.S. Cl.
  CPC ........... B64C 3/185 (2013.01); B64C 3/20 (2013.01); B64C 27/473 (2013.01); *B29L 2031/082* (2013.01); *B64C 2027/4736* (2013.01); *Y02T 50/40* (2013.01); *Y10T 29/49337* (2015.01)

(56) References Cited

U.S. PATENT DOCUMENTS

| | | | | |
|---|---|---|---|---|
| 3,356,153 | A | * | 12/1967 | Schramm ............ B64C 27/473 416/226 |
| 3,967,996 | A | | 7/1976 | Kamov et al. |
| 4,095,322 | A | * | 6/1978 | Scarpati ............ B29C 70/345 156/182 |
| 4,169,749 | A | | 10/1979 | Clark |
| 4,188,171 | A | | 2/1980 | Baskin |
| 5,248,242 | A | * | 9/1993 | Lallo ............ B29C 70/342 156/156 |
| 5,462,409 | A | | 10/1995 | Frengley et al. |
| 5,621,967 | A | | 4/1997 | Frengley et al. |
| 2002/0195524 | A1 | | 12/2002 | Amakoa et al. |
| 2005/0013694 | A1 | | 1/2005 | Kovalsky et al. |
| 2014/0301856 | A1 | * | 10/2014 | Oldroyd ............ B64C 3/20 416/230 |
| 2015/0064013 | A1 | | 3/2015 | Measom et al. |

FOREIGN PATENT DOCUMENTS

| | | |
|---|---|---|
| EP | 3330063 A1 | 6/2018 |
| GB | 1427158 | 3/1976 |

OTHER PUBLICATIONS

European Patent Office, Search Report for EP Appl. No. 13186943.0 dated Jun. 26, 2014, 4 pp.
European Patent Office, Communication pursuant to Article 94(3) EPC for EP Appl. No. 13186943.0 dated Mar. 23, 2015, 4 pp.
European Patent Office, Communication pursuant to Article 94(3) EPC for EP Appl. No. 13186943.0 dated Mar. 23, 2016, 4 pp.
European Patent Office, Communication pursuant to Article 94(3) EPC for EP Appl. No. 13186943.0 dated Sep. 21, 2015, 4 pp.
European Patent Office, Communication pursuant to Article 94(3) EPC for EP Appl. No. 13186943.0 dated Jul. 15, 2014, 6 pp.
European Patent Office, Search Report for EP Appl. No. 18153924.8 dated Apr. 30, 2018, 4 pp.
European Patent Office, Communication pursuant to Article 94(3) EPC for EP Appl. No. 18153924.8 dated Jun. 20, 2018, 6 pp.
Canadian Intellectual Property Office, Examination Report for Canadian Appl. No. 2,861,312 dated Sep. 9, 2015, 4 pp.
Canadian Intellectual Property Office, Examination Report for Canadian Appl. No. 2,861,312 dated Jul. 20, 2016, 4 pp.

* cited by examiner

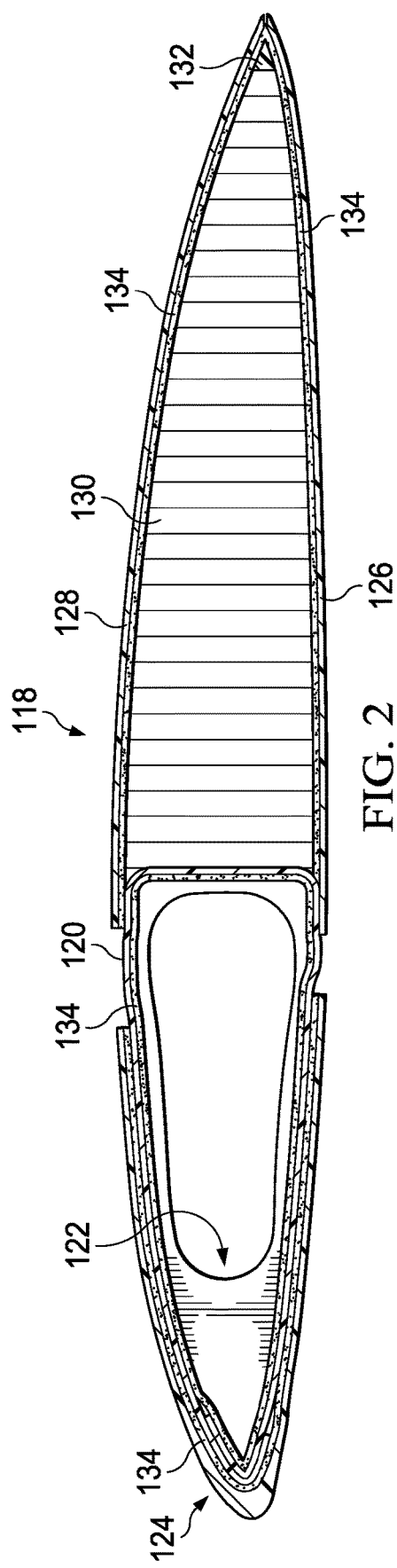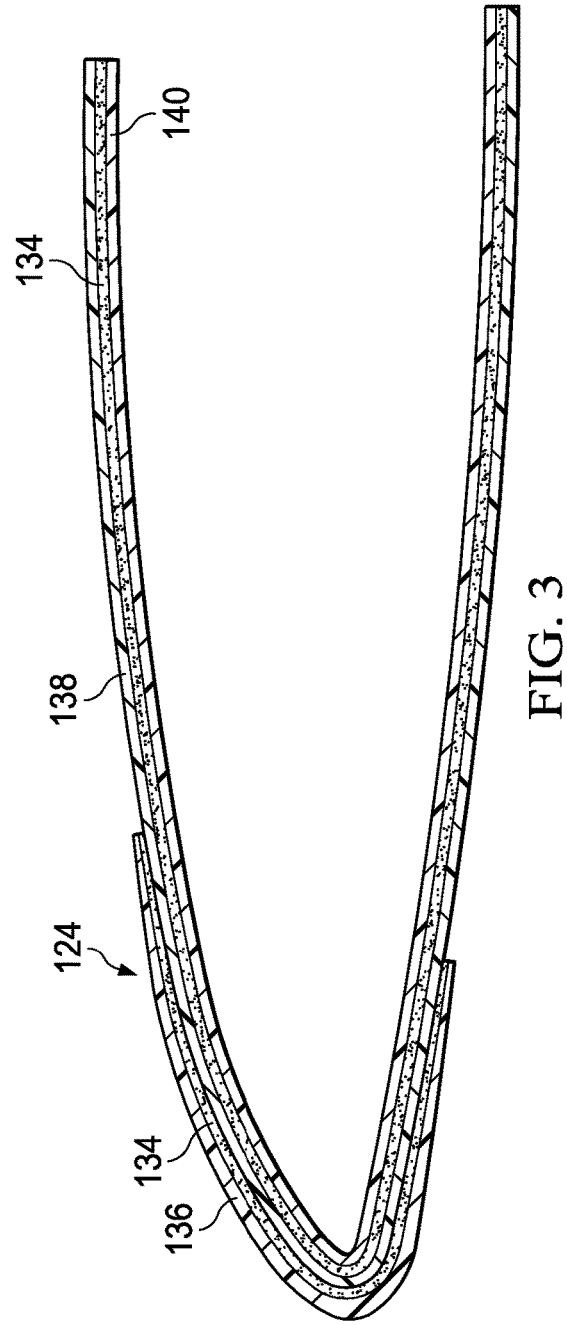

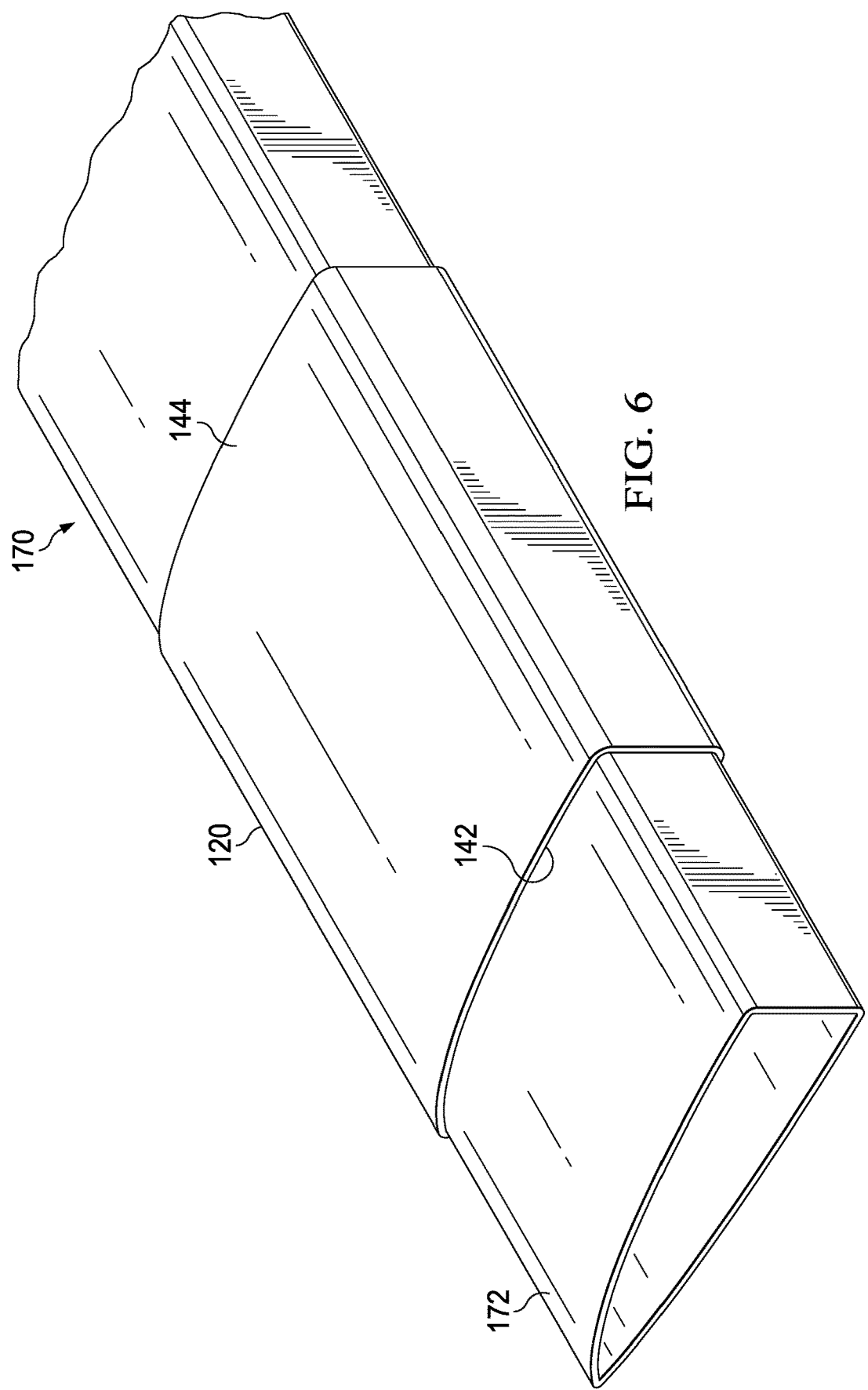

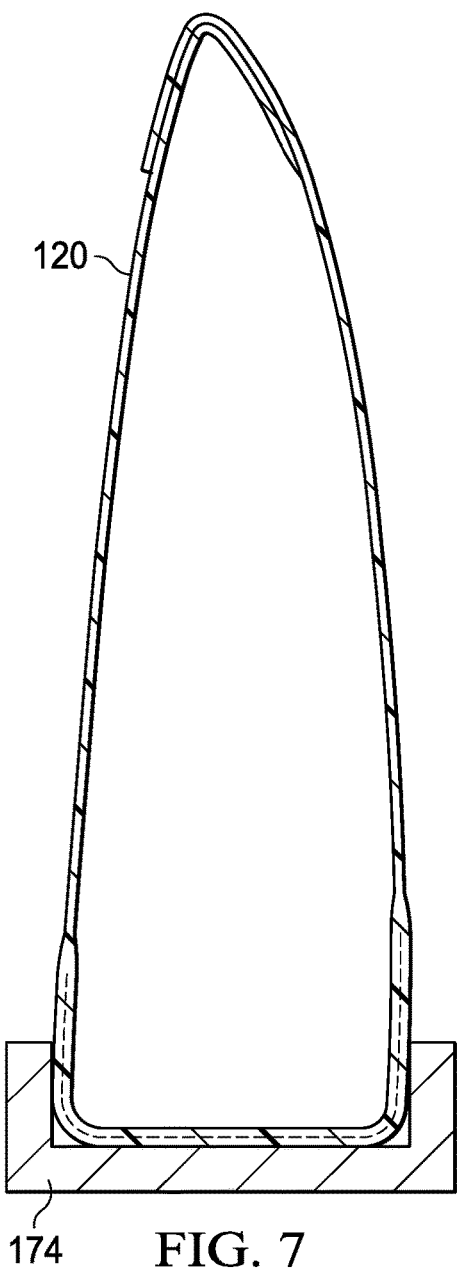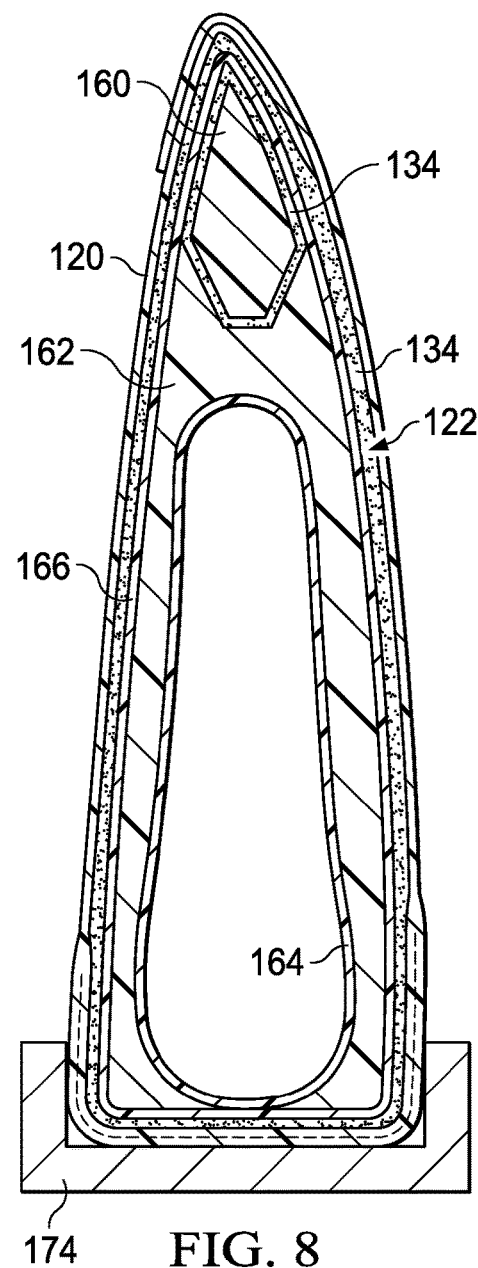

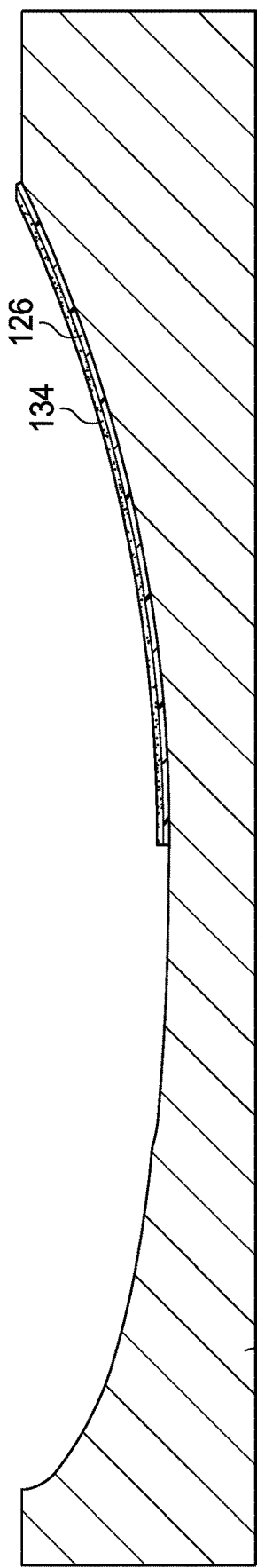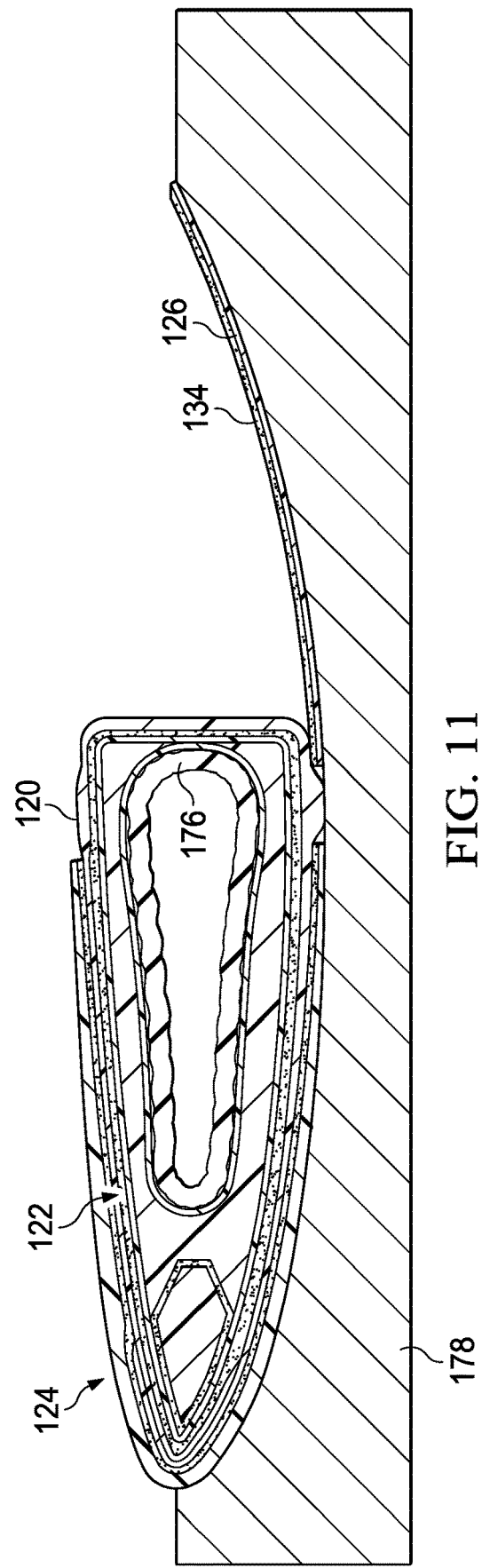

SYSTEMS AND METHODS OF CONSTRUCTING COMPOSITE ASSEMBLIES

CROSS-REFERENCE TO RELATED APPLICATIONS

This application claims priority to and is a divisional patent application of U.S. patent application Ser. No. 14/015,576, filed on Aug. 30, 2013, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Some methods of creating composite assemblies require an inordinate amount of time for curing multiple components separately prior to assembly of the composite assembly. Additionally, some methods of creating composite assemblies produce undesirable void spaces within the composite assembly and/or result in crushing portions of the composite assemblies in molds.

SUMMARY

In some embodiments of the disclosure, a composite assembly is provided that comprises an outer spar component comprising an outer spar component inner profile, an inner spar component comprising an inner spar component outer profile substantially complementary to the outer spar component inner profile, and an adhesive disposed between the outer spar component and the inner spar component.

In other embodiments of the disclosure, a method of constructing a composite assembly is provided that comprises providing a cured outer spar component comprising an outer spar component inner profile, providing an uncured inner spar component comprising an inner spar component outer profile, at least partially enveloping the uncured inner spar component with the outer spar component, and biasing the inner spar component outer profile toward the outer spar component inner profile.

In yet other embodiments of the disclosure, a method of constructing a composite assembly is provided that comprises curing an outer spar component, at least partially enveloping an uncured inner spar component with the outer spar component, and curing the inner spar component while biasing the inner spar component toward the outer spar component.

BRIEF DESCRIPTION OF THE DRAWINGS

For a more complete understanding of the present disclosure and the advantages thereof, reference is now made to the following brief description, taken in connection with the accompanying drawings and detailed description:

FIG. 2 is an orthogonal cut-away view of a composite assembly of the helicopter of FIG. 1;

FIG. 3 is an orthogonal cut-away view of a leading edge assembly of the composite assembly of FIG. 2;

FIG. 6 is an oblique view of a male spar mandrel;

FIG. 7 is an orthogonal cut-away view of a cured outer spar component configured to accept an uncured inner spar assembly;

FIG. 8 is an orthogonal cut-away view of an uncured inner spar assembly disposed within a cured outer spar component;

FIG. 10 is an orthogonal view of a first composite skin and an adhesive disposed on a first mold;

FIG. 11 is an orthogonal view of the leading edge assembly, cured outer spar component, uncured inner spar assembly, and bladder disposed on a first mold and in contact with the first composite skin;

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
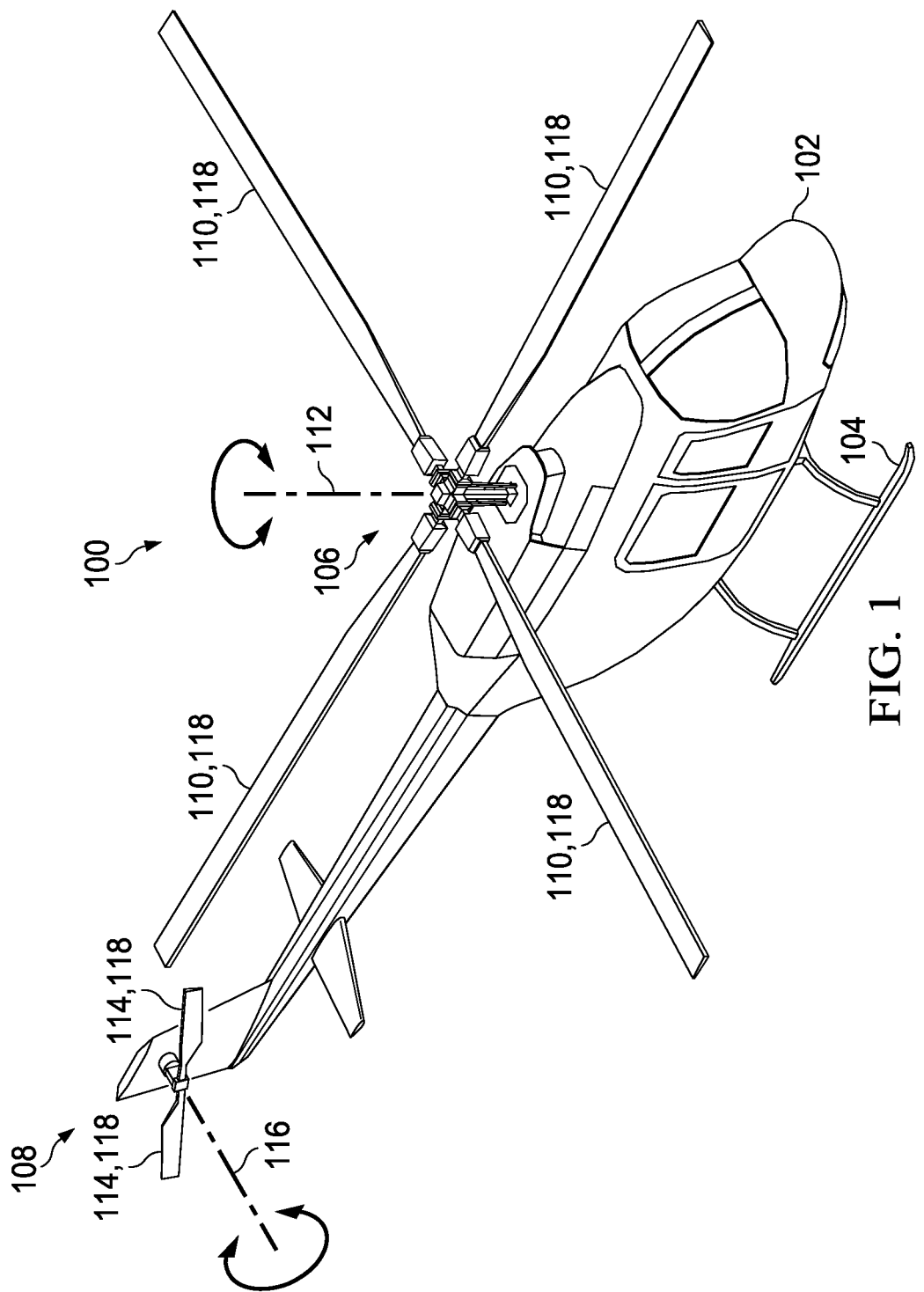
FIG. 1 is an oblique view of a helicopter according to an embodiment of the disclosure.

Referring now to FIG. 1, an oblique view of a helicopter 100 is shown.

The helicopter 100 generally comprises a fuselage 102, landing gear 104, a main rotor assembly 106, and a tail rotor assembly 108. The main rotor assembly 106 is generally configured to selectively rotate main rotor blades 110 about an axis of rotation 112. The tail rotor assembly 108 is generally configured to selectively rotate tail rotor blades 114 about an axis of rotation 116. Each of the main rotor blades 110 and the tail rotor blades 114 may comprise composite assemblies 118.

Referring now to FIG. 2, an orthogonal cut-away view of a composite assembly 118 is shown according to an embodiment of the disclosure. Composite assembly 118 generally comprises an outer spar component 120, an inner spar assembly 122, a leading edge assembly 124, a first composite skin 126, a second composite skin 128, a composite core material 130, and a trailing edge component 132. In some embodiments, the outer spar component 120 may be secured to each of the inner spar assembly 122 and the leading edge assembly 124 by adhesive 134. Similarly, the composite core material 130 may be secured between the first composite skin 126 and the second composite skin 128 by adhesive 134. Adhesive 134 may also be used to secure the trailing edge component 132 to each of the composite core material 130, the first composite skin 126, and the second composite skin 128. Further, adhesive 134 may be used to secure each of the first composite skin 126 and the second composite skin 128 to the outer spar component 120.

Referring now to FIG. 3, an orthogonal cut-away view of the leading edge assembly 124 is shown. The leading edge assembly 124 generally comprises a nose guard 136, an abrasion strip 138, and a heater blanket 140. The nose guard 136 may form a leading edge of the composite assembly 118 and may overlap a leading portion of the abrasion strip 138.

Each of the nose guard 136 and the abrasion strip 138 may comprise metal and may be configured to generally protect the composite assembly 118 from impact and/or wear during rotation of the composite assembly 118. The abrasion strip 138 may substantially cover an exterior portion of the heater blanket 140. The heater blanket 140 generally comprises an electrically resistive material encased within a carrier material that may be bent, cured, and/or otherwise made to conform to a portion of the composite assembly 118 at which reduction of ice formation may be beneficial. In some embodiments, the abrasion strip 138 may be secured between the nose guard 136 and the heater blanket 140 by adhesive 134. In some cases, the leading edge assembly 124 may be constructed, bonded, cured, and/or otherwise assembled in a process separate from the remainder of the construction of the composite assembly 118. In other cases, the components of the leading edge assembly 124 may be laid up and simultaneously bonded, cured, and/or otherwise assembled with other components of the composite assembly 118.

Figure 4:
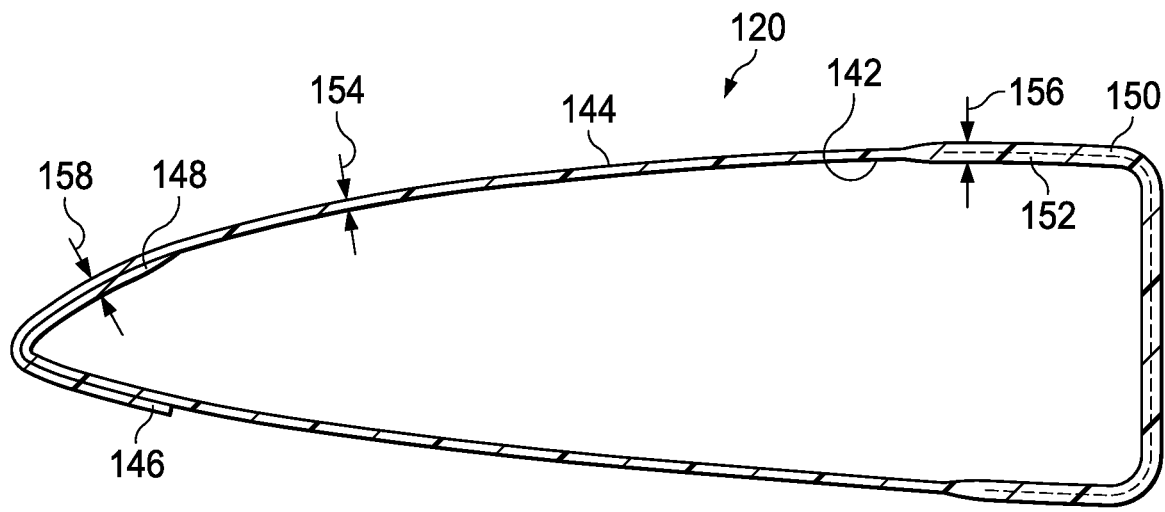
FIG. 4 is an orthogonal cut-away view of an outer spar component of the composite assembly of FIG. 2.

Referring now to FIG. 4, an orthogonal cut-away view of the outer spar component 120 is shown. The outer spar component 120 generally comprises one or more layers of composite laminate material, such as, but not limited to, pre-impregnated directional fiber composite laminate materials that may initially be provided wet and/or uncured and later hardened through a curing process in which drying and/or heating the composite laminate material is undertaken. In some embodiments, the composite laminate material may comprise carbon fibers, glass, and/or any other suitable structural fibers. In this embodiment, the outer spar component 120 comprises generally an outer spar component inner profile 142 and an outer spar component outer profile 144. The outer spar component 120 also comprises a first wrap end portion 146 and a second wrap end portion 148 that generally overlap each other. In this embodiment, the outer spar component 120 comprises a first composite laminate layer 150 and a second composite laminate layer 152. The first composite laminate layer 150 generally extends to form the outer spar component outer profile 144. However, both the first composite laminate layer 150 and the second composite laminate layer 152 share in forming the outer spar component inner profile 142. In some embodiments where the thickness of each of the first composite laminate layer 150 and the second composite laminate layer 152 are substantially the same, the outer spar component 120 may accordingly comprise variations in thickness as measured along the outer spar component inner profile 142. More specifically, the outer spar component 120 may comprise a first thickness 154 generally attributed to the single layer of the first composite laminate layer 150, a second thickness 156 generally attributable to the stacked orientation of the first composite laminate layer 150 and the second composite laminate layer 152, and a third thickness 158 generally attributable to the overlapping orientation of the first wrap end portion 146 and second wrap end portion 148 of the first composite laminate layer 150.

Figure 5:
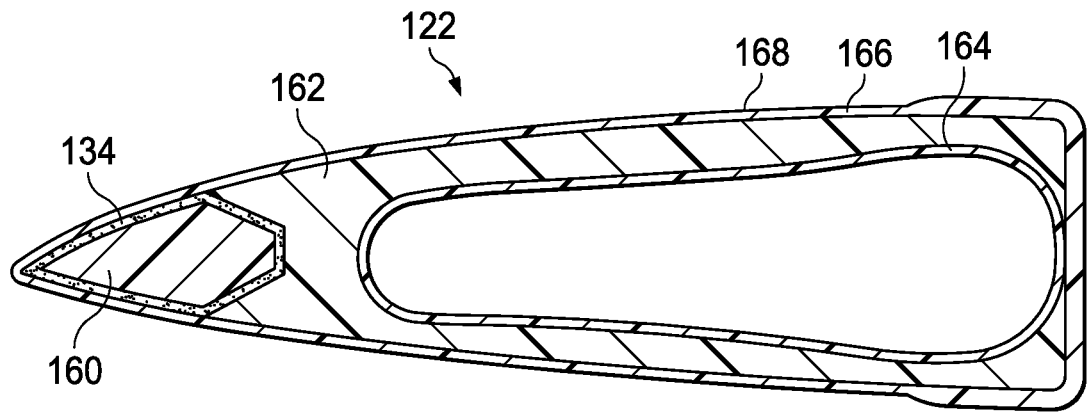
FIG. 5 is an orthogonal cut-away view of an inner spar assembly of the composite assembly of FIG. 2.

Referring now to FIG. 5, an orthogonal cut-away view of the inner spar assembly 122 is shown. The inner spar assembly 122 generally comprises a weight 160, a composite filler 162, an inner composite laminate wall 164, and an inner spar component 166. The weight 160 may comprise metal and/or any other suitable material. The composite filler 162 may comprise a unidirectional composite material, such as, but not limited to, a glass and/or epoxy mixture and/or other composite laminates well suited for filling relatively large interior spaces of the inner spar assembly 122 while also providing structural integrity to the composite assembly 118. In some embodiments, the weight 160 may be secured to one or more of the inner spar component 166 and the composite filler 162 using adhesive 134. In some embodiments, the inner spar component 166 comprises an inner spar component outer profile 168 that generally complements the outer spar component inner profile 142. Each of the inner composite laminate wall 164 and the inner spar component 166 may comprise one or more layers of composite laminate material, such as, but not limited to, pre-impregnated directional fiber composite laminate materials that may initially be provided wet and/or uncured and later hardened through a curing process in which drying and/or heating the composite laminate material is undertaken. In some embodiments, the composite laminate material may comprise carbon fibers, glass, and/or any other suitable structural fibers.

Referring now to FIGS. 6-14, the steps of a method of constructing a composite assembly 118 according to an embodiment of the disclosure are shown. In some embodiments, methods of constructing composite assemblies 118 may require creating and/or providing a cured outer spar component 120 and thereafter assembling uncured and/or unbonded composite assembly 118 components relative to the cured outer spar component 120. Referring now to FIG. 6, an oblique view of outer spar component mandrel 170 is shown. The outer spar component mandrel 170 generally comprises a mandrel outer profile 172 complementary to and substantially the same as the outer spar component inner profile 142. In some embodiments, wet and/or uncured composite laminate material layers may be laid up on the outer spar component mandrel 170 and thereafter biased toward the mandrel outer profile 172 under heat and/or pressure. In some cases, a bladder and/or bag may be placed around the wet and/or uncured composite laminate material that is laid up on the outer spar component mandrel 170 and evacuated to form the outer spar component 120. With the bladder and/or bag evacuated, heat may be applied to cure the outer spar component 120. After the outer spar component 120 has cured, the outer spar component 120 may be removed from the outer spar component mandrel 170.

Referring now to FIG. 7, after removing the cured outer spar component 120 from the outer spar component mandrel 170, the outer spar component 120 may be supported and/or secured by a holding device 174. In this supported and/or secured position, the outer spar component 120 may be provided with additional composite assembly 118 components.

Referring now to FIG. 8, with the outer spar component 120 supported and/or secured, the components of the inner spar assembly 122 may be provided to an interior space that is substantially enveloped by the cured outer spar component 120. In some embodiments, the components of the inner spar assembly 122 may be provided wet and/or uncured. In cases where the cured outer spar component 120 and the inner spar component 166 are not expected to adhere sufficiently as a result of simply curing the inner spar component 166 in abutment to the outer spar component 120, adhesive 134 may be provided between the outer spar component 120 and the inner spar component 166.

Figure 9:
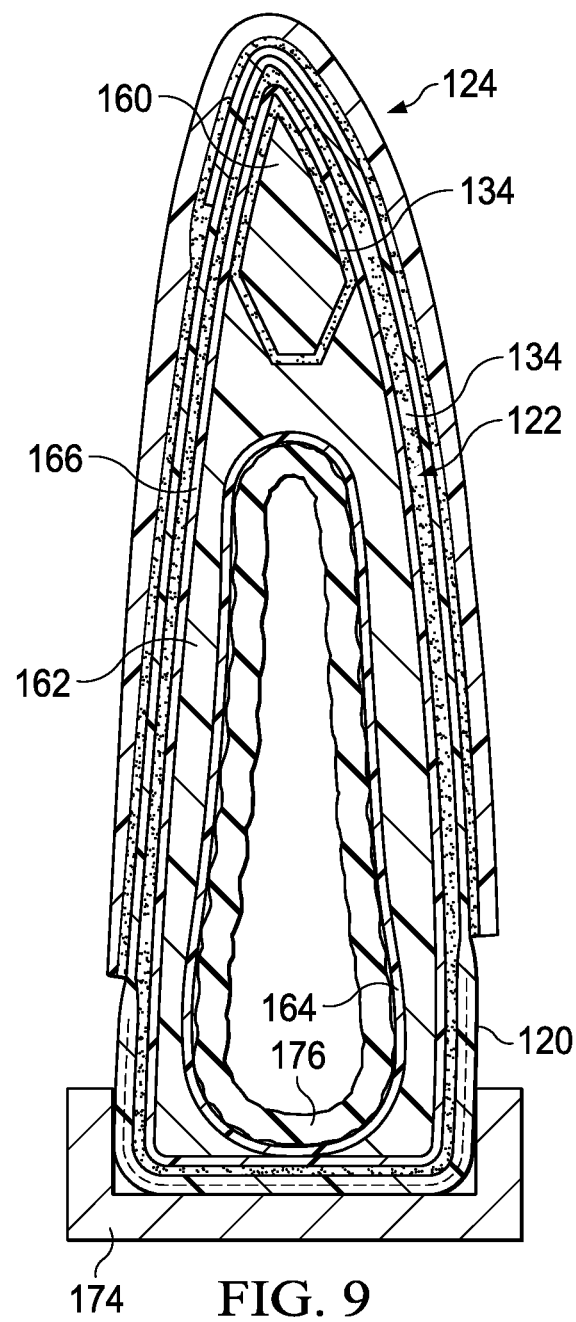
FIG. 9 is an orthogonal cut-away view of an uncured inner spar assembly disposed within a cured outer spar component and with a leading edge assembly disposed on the cured outer spar component and a bladder inserted into an interior space substantially enveloped by the uncured inner spar.

Referring now to FIG. 9, with the uncured inner spar assembly 122 components laid up within the cured outer spar component 120, the leading edge assembly 124 may be laid up to the exterior of the outer spar component 120. Adhesive 134 may be provided between the leading edge assembly 124 and the exterior of the outer spar component 120. Next, an expandable bladder 176 may be inserted into an interior space substantially enveloped by the uncured components of the inner spar assembly 122. The bladder 176 may be inserted in a substantially deflated and/or unexpanded state to allow the insertion.

Referring now to FIG. 10, while the leading edge assembly 124, cured outer spar component 120, and uncured inner spar assembly 122 are prepared and maintained on the holding device 174, a first mold 178 may be prepared to receive the components. The first mold 178 may be prepared by laying the first composite skin 126 onto the first mold 178. Next, adhesive 134 may be applied to an upper surface of the first composite skin 126.

Referring now to FIG. 11, with the first composite skin 126 in place on the first mold 178, the leading edge assembly 124, cured outer spar component 120, and uncured inner spar assembly 122 may be transferred from the holding device 174 to the first mold 178. The components may be carried by the bladder 176 even though the bladder 176 is not significantly expanded. In some embodiments, the D-shaped end of the outer spar component 120 may be laid on the first composite skin 126 and the associated adhesive.

Figure 12:
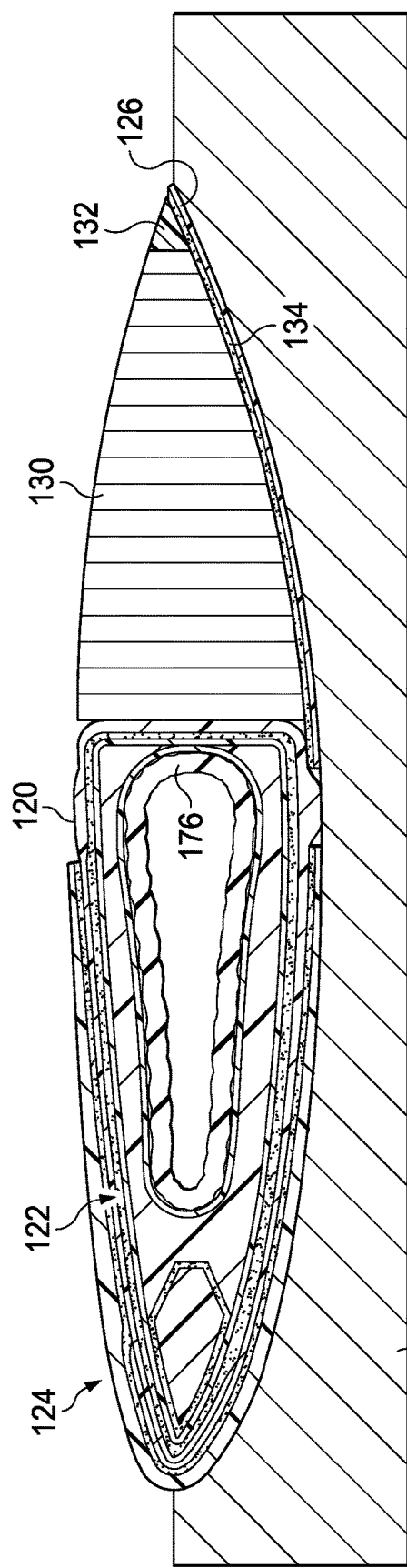
FIG. 12 is an orthogonal view of a composite core component and a trailing edge component disposed on a first mold and in contact with the adhesive on the first composite skin.

Referring now to FIG. 12, with the outer spar component 120 and the first composite skin 126 secured relative to each other, the composite core material 130 may be laid upon the first composite skin 126 and associated adhesive 134 and substantially in abutment with the outer spar component 120. Additionally, the trailing edge component 132 may be laid upon the first composite skin 126 and associated adhesive 134 and substantially in abutment with the composite core material 130.

Figure 13:
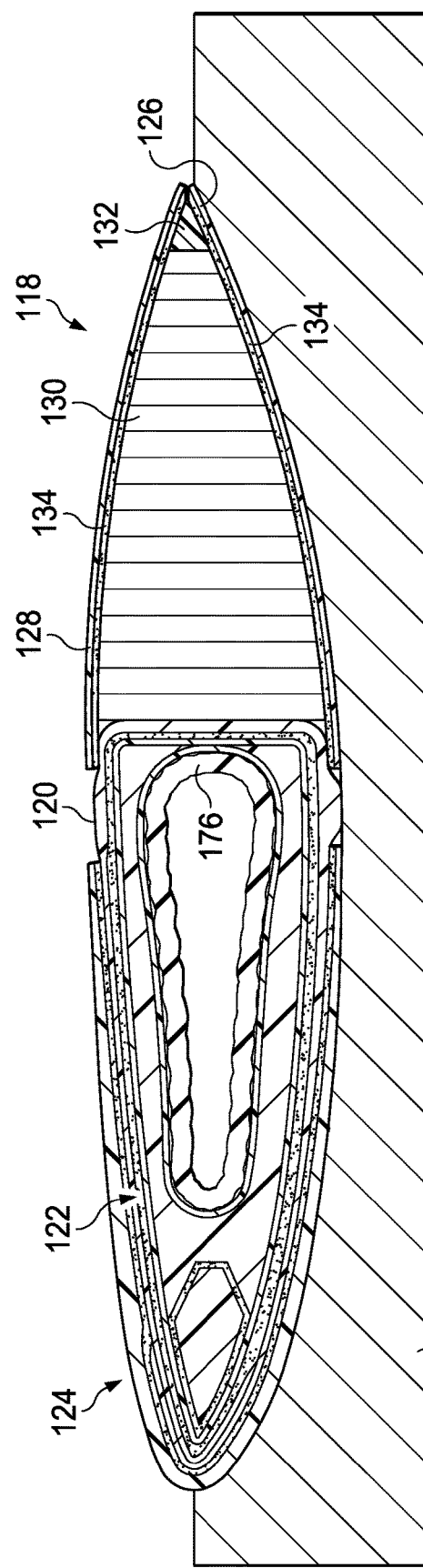
FIG. 13 is an orthogonal view of a second composite skin and an adhesive disposed on a first mold and in contact with the composite core component and the trailing edge component.

Referring now to FIG. 13, with composite core material 130 and the trailing edge component 132 in place relative to the outer spar component 120, the second composite skin 128 may be laid upon each of the composite core material 130, the trailing edge component 132, and the outer spar component 120 with adhesive 134 provided therebetween.

Figure 14:
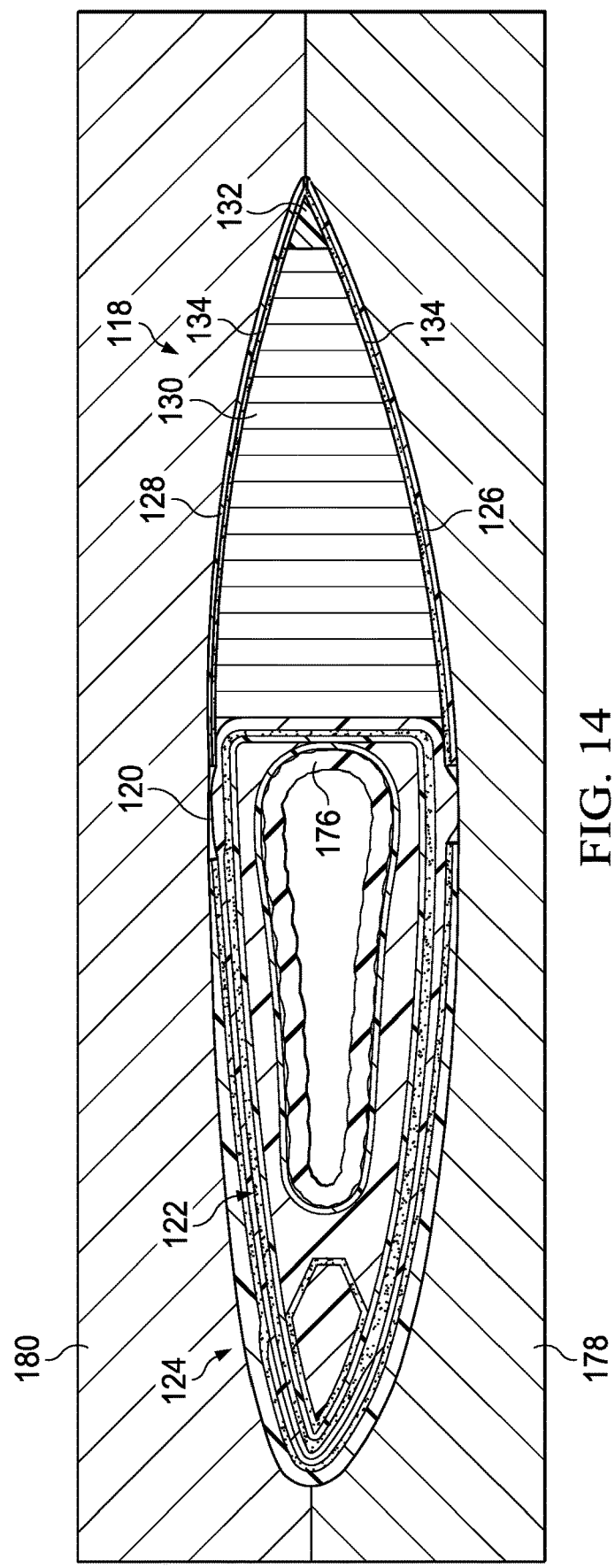
FIG. 14 is an orthogonal view of a second mold cooperating with a first mold to capture the composite assembly components of FIG. 13 and with the bladder expanded to bias the uncured inner spar assembly toward the cured outer spar component.

Referring now to FIG. 14, with all of the composite assembly 118 components disposed on the first mold 178, a second mold 180 may be provided and brought into close alignment with the components of the composite assembly 118. Particularly, the second mold 180 may complement the outer spar component outer profile 144 and the upper surfaces of the leading edge assembly 124 and second composite skin 128. In some cases, the second mold 180 may be brought into contact with the first mold 178 only after the components of the composite assembly 118 are heated up and relatively flexible. Once the first mold 178 and second mold 180 are mated to each other to closely control the exterior profile of the composite assembly 118, the bladder 176 may be expanded and/or pressurized to force the uncured inner spar assembly 122 components outward and against the cured outer spar component 120. The bias force provided by the bladder 176 may reduce a number and/or size of voids formed between the cured outer spar component 120 and the uncured inner spar assembly 122. Similarly, the bias force provided by the bladder 176 may cause improved bonding between components to be joined by the adhesive 134.

Figure 15:
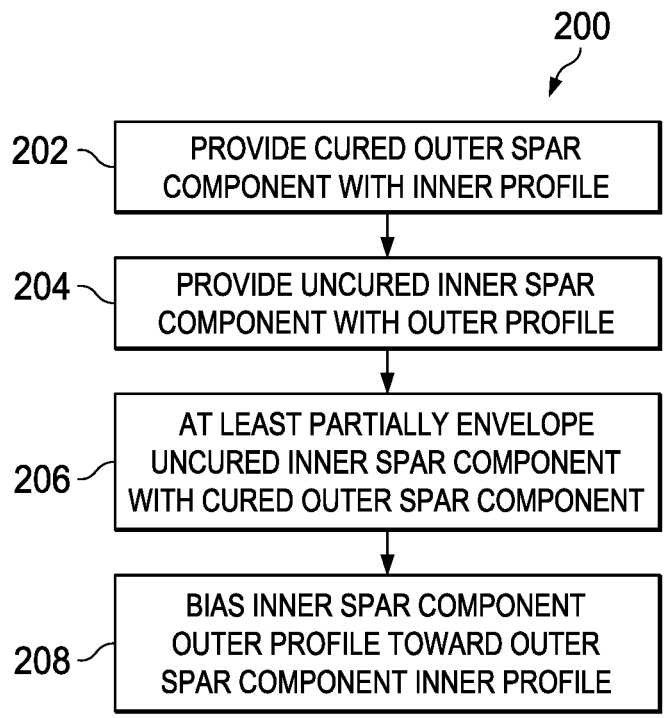
FIG. 15 is a flowchart of a method of constructing a composite assembly according to an embodiment of the disclosure.

Referring now to FIG. 15, a flowchart of a method 200 of constructing a composite assembly is shown. The method 200 may begin at block 202 by providing a cured outer spar component comprising an outer spar component inner profile. The method 200 may continue at block 204 by providing an uncured inner spar component comprising an inner spar component outer profile. The method 200 may continue at block 206 by at least partially enveloping the uncured inner spar component with the outer spar component. The method 200 may continue at block 208 by biasing the inner spar component outer profile toward the outer spar component inner profile. In some embodiments, heat may be applied during the biasing to cure the uncured inner spar component.

Figure 16:
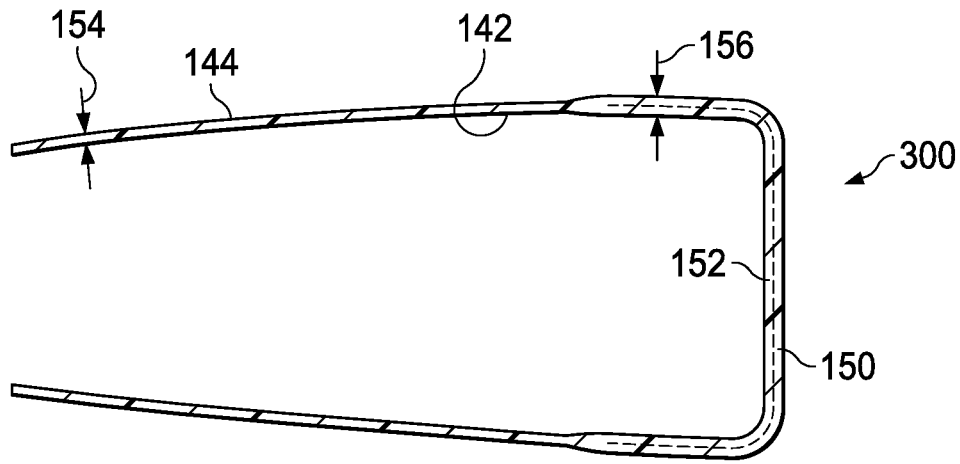
FIG. 16 is an orthogonal cut-away view of an alternative embodiment of a composite assembly according to an embodiment of the disclosure.

Referring now to FIG. 16, an alternative embodiment of an outer spar component 300 is disclosed. The outer spar component 300 is substantially similar to outer spar component 120 but for the lack of overlapping end portions.

Figure 17:
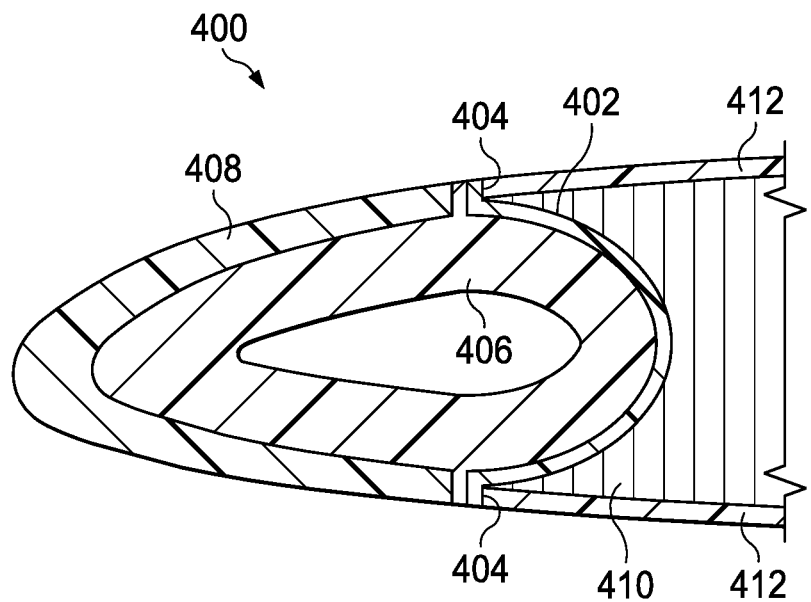
FIG. 17 is an orthogonal cut-away view of another alternative embodiment of a composite assembly according to an embodiment of the disclosure.

Referring now to FIG. 17, an alternative embodiment of a composite assembly 400 is shown. Composite assembly 400 comprises an outer spar component 402 that is substantially similar to outer spar component 300 but is relatively more C-shaped than D-shaped and comprises end walls 404. The composite assembly 400 further comprises an inner spar component 406, a leading edge assembly 408, composite core material 410, and composite skins 412. In this embodiment where the composite skins 412 are relatively thick, the composite skins 412 may generally abut the end walls 404. In some embodiments, the composite assembly 400 may be constructed in a manner substantially similar to method 200 so that an uncured inner spar component 406 is cured within and/or bonded to the previously cured outer spar component 402 while other components of the composite assembly 400 are bonded together.

Figure 18:
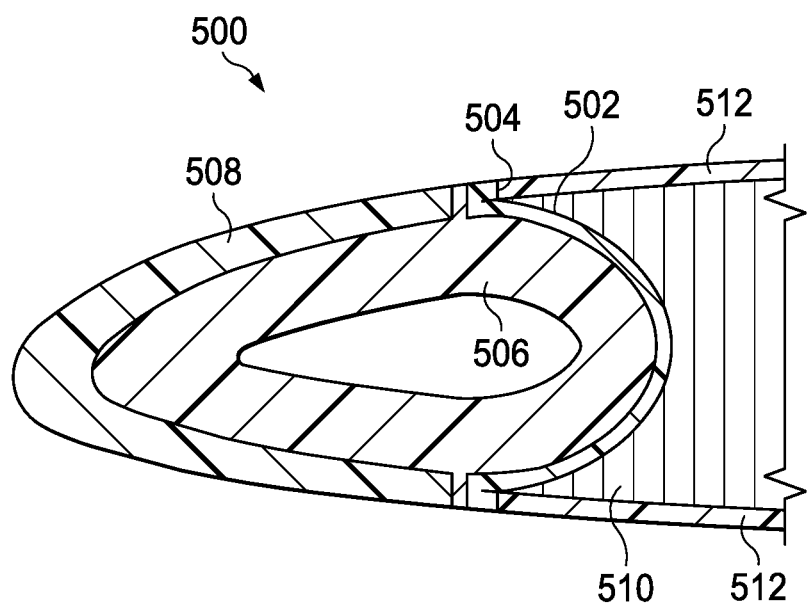
FIG. 18 is an orthogonal cut-away view of yet another alternative embodiment of a composite assembly according to an embodiment of the disclosure.

Referring now to FIG. 18, an alternative embodiment of a composite assembly 500 is shown. Composite assembly 500 comprises an outer spar component 502 that is substantially similar to outer spar component 300 but is relatively more C-shaped than D-shaped and comprises folded ends 504. The composite assembly 500 further comprises an inner spar component 506, a leading edge assembly 508, composite core material 510, and composite skins 512. In this embodiment where the composite skins 512 are relatively thin, the composite skins 512 may generally abut the folded ends 504. In some embodiments, the composite assembly 500 may be constructed in a manner substantially similar to method 200 so that an uncured inner spar component 506 is cured within and/or bonded to the previously cured outer spar component 502 while other components of the composite assembly 500 are bonded together.

Embodiments of the disclosure may be used with a helicopter such as helicopter 100. However, it should be understood that the helicopter example is given merely for illustration purposes only. Embodiments of the present disclosure are not limited to any particular setting or application, and embodiments can be used with a rotor system in any setting or application such as with other aircraft, vehicles, or equipment. Certain embodiments of the composite assemblies and methods of forming such disclosed herein may be used for any application involving a composite, aerodynamically shaped object. For example, some embodiments of the composite assemblies disclosed herein may be used for the main and/or tail rotors of a rotorcraft, such as helicopter 100. Also, some embodiments of the composite assemblies disclosed herein may be used for the wings of a fixed-wing aircraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_1$, and an upper limit, $R_u$, is disclosed, any number falling within the range is specifically disclosed. In particular, the following numbers within the range are specifically disclosed: $R=R_1+k*(R_u-R_1)$ wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A composite assembly, comprising:
   a cured outer spar component comprising a relatively C-shaped portion, an upper end wall that extends vertically upwards from a top of the relatively C-shaped portion, and a lower end wall that extends vertically downwards from a bottom end of the relatively C-shaped portion;
   a composite core material substantially in abutment with an inner profile of the cured outer spar component;
   an upper composite skin located above the composite core material and abutting the upper end wall of the cured outer spar component; and
   a lower composite skin located below the composite core material and abutting the lower end wall of the cured outer spar component.

2. The composite assembly of claim 1, wherein the cured outer spar component comprises a composite laminate material.

3. The composite assembly of claim 1, further comprising an inner spar component having an inner spar component outer profile substantially in abutment with the cured outer spar component.

4. The composite assembly of claim 3, wherein the inner spar component comprises a composite laminate material.

5. The composite assembly of claim 3, wherein the inner profile of the cured outer spar component substantially circumscribes the inner spar component outer profile.

6. The composite assembly of claim 3, further comprising an adhesive disposed between the cured outer spar component and the inner spar component.

7. The composite assembly of claim 3, wherein the inner spar component is cured when the inner spar component is bonded to the cured outer spar component.

8. The composite assembly of claim 3, further comprising an interior space substantially enveloped by the inner spar component.

9. The composite assembly of claim 3, further comprising a leading edge assembly disposed on the inner spar component.

10. The composite assembly of claim 1, wherein:
    the upper end wall further comprises an upper folded end portion that overlays an upper portion of the cured outer spar component; and
    the lower end wall further comprises a lower folded end portion that overlays a lower portion of the cured outer spar component.

11. A composite assembly, comprising:
    a cured outer spar component comprising a relatively C-shaped portion, an upper end wall that extends vertically upwards from a top of the relatively C-shaped portion, and a lower end wall that extends vertically downwards from a bottom end of the relatively C-shaped portion;
    a composite core material substantially in abutment with an inner profile of the cured outer spar component;
    an upper composite skin located above the composite core material and abutting the upper end wall of the cured outer spar component;
    a lower composite skin located below the composite core material and abutting the lower end wall of the cured outer spar component;
    an inner spar component having an inner spar component outer profile substantially in abutment with the cured outer spar component; and
    a leading edge assembly disposed on the inner spar component.

12. The composite assembly of claim 11, wherein the cured outer spar component comprises a composite laminate material.

13. The composite assembly of claim 11, wherein the inner spar component comprises a composite laminate material.

14. The composite assembly of claim 11, wherein the inner profile of the cured outer spar component substantially circumscribes the inner spar component outer profile.

15. The composite assembly of claim 11, further comprising an adhesive disposed between the cured outer spar component and the inner spar component.

16. The composite assembly of claim 11, wherein the inner spar component is cured when the inner spar component is bonded to the cured outer spar component.

17. The composite assembly of claim 11, further comprising an interior space substantially enveloped by the inner spar component.

18. The composite assembly of claim 11, wherein:
the upper end wall further comprises an upper folded end portion that overlays an upper portion of the cured outer spar component; and
the lower end wall further comprises a lower folded end portion that overlays a lower portion of the cured outer spar component.

\* \* \* \* \*